(12) United States Patent
Yi et al.

(10) Patent No.: US 9,302,392 B2
(45) Date of Patent: Apr. 5, 2016

(54) METHOD AND DEVICE FOR CONTROLLING MECHANICAL ARTICULATED ARM

(75) Inventors: Xiaogang Yi, Changsha (CN); Xiang Zhou, Changsha (CN); Antao Chen, Changsha (CN); Qiulian Deng, Changsha (CN)

(73) Assignees: Hunan Sany Intelligent Control Equipment Co., Ltd., Changsha (CN); Sany Heavy Industry Co., Ltd., Changsha (CN)

( * ) Notice: Subject to any disclaimer, the term of this patent is extended or adjusted under 35 U.S.C. 154(b) by 491 days.

(21) Appl. No.: 13/807,220

(22) PCT Filed: Jun. 22, 2011

(86) PCT No.: PCT/CN2011/076099
§ 371 (c)(1),
(2), (4) Date: Apr. 8, 2013

(87) PCT Pub. No.: WO2012/000400
PCT Pub. Date: Jan. 5, 2012

(65) Prior Publication Data
US 2013/0197695 A1  Aug. 1, 2013

(30) Foreign Application Priority Data
Jul. 1, 2010 (CN) .......................... 2010 1 0219928

(51) Int. Cl.
*G05B 15/00* (2006.01)
*G05B 19/00* (2006.01)
*B25J 9/16* (2006.01)

(52) U.S. Cl.
CPC .............. *B25J 9/1694* (2013.01); *B25J 9/1638* (2013.01); *B25J 9/16* (2013.01); *B25J 9/1633* (2013.01); *G05B 2219/39176* (2013.01)

(58) Field of Classification Search
CPC .......... B25J 9/1638; B25J 9/1694; B25J 9/16; B25J 9/1633; G05B 2219/39176

USPC ................................................. 700/245–259
See application file for complete search history.

(56) References Cited

U.S. PATENT DOCUMENTS 4,570,065 A * 2/1986 Pryor ....................... 250/559.33
6,654,665 B2 * 11/2003 Arai et al. ...................... 700/258

(Continued)

FOREIGN PATENT DOCUMENTS

CN          101522377 A     9/2009
CN          101633168 A     1/2010

(Continued)

OTHER PUBLICATIONS

English Translation for reference JP11000883.*

*Primary Examiner* — Jason Holloway
*Assistant Examiner* — Rachid Bendidi
(74) *Attorney, Agent, or Firm* — Bret E. Field; Bozicevic, Field & Francis LLP

(57) ABSTRACT

A control method of a mechanical articulated arm, wherein at least two tilt sensors are arranged in different positions of the articulated arm, comprising: calibrating zero positions of tilt sensors when articulated arm does not have elastic deformation, setting position of tail end of articulated arm as point P and point P' before and after elastic deformation of articulated arm, and selecting point R on the articulated arm; detecting angles of two different positions of the articulated arm with the tilt angles before and after the elastic deformation, obtaining the angle offset $\Delta\theta$ of the articulated arm due to the elastic deformation, and calculating the length parameter $L_a$ and the angle parameter $\theta_a$ of the articulated arm after deformation based on the lengths of OR and RP'; and controlling the action of the articulated arm according to position parameters $X_p'$ and $Y_p'$ (to the point P') obtained according to length parameter $L_a$ and angle parameter $\theta_a$.

12 Claims, 6 Drawing Sheets

(56) References Cited

U.S. PATENT DOCUMENTS

| | | | |
|---|---|---|---|
| 7,657,355 B2* | 2/2010 | Rau et al. | 701/50 |
| 7,747,351 B2* | 6/2010 | Tsusaka et al. | 700/245 |
| 2004/0076503 A1* | 4/2004 | Rau et al. | 414/699 |
| 2005/0278099 A1* | 12/2005 | Benckert et al. | 701/50 |
| 2008/0162005 A1* | 7/2008 | Tang et al. | 701/50 |
| 2009/0105880 A1* | 4/2009 | Okazaki | 700/258 |
| 2010/0139792 A1* | 6/2010 | Rau et al. | 137/615 |

FOREIGN PATENT DOCUMENTS

| | | | |
|---|---|---|---|
| CN | 101870110 A | | 10/2010 |
| JP | 11000883 A | * | 1/1999 |
| JP | 11165287 A | | 6/1999 |

\* cited by examiner

METHOD AND DEVICE FOR CONTROLLING MECHANICAL ARTICULATED ARM

The present application claims the priority to the Chinese invention patent application No. 201010219928.0 filed with the State Intellectual Property Office of the PRC on Jul. 1, 2010 and entitled "Control Method and Control Device of Mechanical Articulated Arm", which is incorporated herein by reference in its entirety.

FIELD OF THE INVENTION

The present invention relates to a positioning field of a mechanical articulated arm, and especially, to a control method and a control device of the mechanical articulated arm.

BACKGROUND OF THE INVENTION

As known to all, the traditional control manner of mechanical arm systems is a manual mode of manual operation, and an operator operates different handles to realize coordinated movements of multiple segments of a mechanical arm and then to reach a target position, but this manner has many disadvantages. For example, during the manual operation, especially in a situation of desiring the linkage and coordination of multiple segments of the mechanical arm, the efficiency and precision of the manual operation are usually low; the manual operation has high requirement on the operator's proficiency in the operation, and during the operation, the operator needs to always take care of the movements of the articulated arm, and there exists the danger of throwing construction personnel off buildings in case of any carelessness, thus there exists the disadvantages of poor safety and high labour strength.

With the quickly changing developments of society and science, how to provide a better working environment for workers and how to reduce the labour strength of the workers to the maximum extent have been always a focus and a hot issue during the research and development of mechanical arm systems. In 1993, the PUTZMEISTER company put forward in the U.S. Pat. No. 5,640,996A realizing the coordinated movements of multiple segments of a mechanical arm by the separate adjustment of the handles of a remote controller, so that the multiple segments will not affect one another and can independently retract, rotate and elevate, and also disclosed the first time in 1994 in the U.S. Pat. No. 5,823,218 the follow-up function of an end hose, that is, an operator guides the end hose to move to a concrete pouring point to realize the follow-up function of the mechanical arm.

Although research personnel home and abroad have always been trying to realize the robotization of mechanical arms, up to now, the application still cannot fully meet the demand of engineering, and the difficulty mainly lies in the precision of control.

Referring to FIG. 1, it is a schematic diagram of a two-segment articulated arm, from FIG. 1 the two-axle mechanical arm can rotate about the joints O1 and O2, and the length of O1 and O2 is l1, the length of O2 A is l2, from geometric analysis and according to the rotation angles θ1 and θ2 of the joints, the movement equation of the mechanical arm can be established as follows:

$$x = l_1 \cos\theta_1 + l_2 \cos(\theta_1+\theta_2) \qquad \text{Equation 1}$$

$$y = l_1 \sin\theta_1 + l_2 \sin(\theta_1+\theta_2) \qquad \text{Equation 2}$$

wherein, (x, y) are the coordinate of the tail end A.

Further, during mechanical arm control and track planning, usually the movement amounts of the joints need to be calculated in the situation that the spatial position which a point will reach is known, so as to drive the movements of the joints and meet the position of the end point.

Equations 1 and 2 are simplified to render:

$$x^2+y^2=l_1^2+l_2^2+2l_1l_2[\cos\theta_1 \cos(\theta_1+\theta_2)+\sin\theta_1 \sin(\theta_1+\theta_2)]=l_1^2+l_2^2+2l_1l_2\cos\theta_2 \qquad \text{Equation 3}$$

$$\theta_2 = \arccos\left(\frac{x^2+y^2-l_1^2-l_2^2}{2l_1l_2}\right) \qquad \text{Formula 4}$$

$$\theta_1 = \arctan\left(\frac{y}{x}\right) - \arccos\left(\frac{x^2+y^2+l_1^2-l_2^2}{2l_1\sqrt{x^2+y^2}}\right). \qquad \text{Formula 5}$$

Thus, in the situation that the position A(X, Y) to be reached is known, the desired rotation angles θ1 and θ2 of the joints can be obtained, and driving hydraulic oil cylinder controls the rotation of the mechanical arm so that the tail end of the mechanical arm reaches the target position A(X, Y). However, the movements of the mechanical arm can be divided into rigid movement and flexible movement due to its flexibility, the above calculations omit the flexibility of the mechanical frame, which will result in that there exists great deviation between the final calculations, the planning results and the facts, thus the precision of the control is affected.

SUMMARY OF THE INVENTION

The technical problem to be solved by the present invention is to provide a control method of a mechanical articulated arm, which enhances testability and controllability on the state of the articulated arm and then improves control precision.

The control method of a mechanical articulated arm according to the present invention at least arranges two tilt sensors at different positions of the articulated arm, and the method includes: calibrating the zero positions of the tilt sensors when the articulated arm does not have elastic deformation, setting positions of a tail end of the articulated arm to be a point P and a point P' respectively before and after the elastic deformation, and selecting a point R at the articulated arm; using the tilt sensors to detect the angle values of the two different positions of the articulated arm before and after the elastic deformation, obtaining an angle offset Δθ of the articulated arm due to the elastic deformation, and calculating a length parameter La and an angle parameter θa of the articulated arm after the deformation based on the angle offset Δθ and the length values of OR and RP'; obtaining the position parameters $X_p'$ and $Y_p'$ of the point P' according to the length parameter La and the angle parameter θa, and controlling the action of the articulated arm according to the position parameters $X_p'$ and $Y_p'$ and a control target.

Preferably, at least two tilt sensors are provided at different positions of the articulated arm by providing a tilt sensor at the head end and the tail end of each segment of the articulated arm, respectively.

Preferably, the point R selected at the articulated arm is the middle position of the arc formed after the elastic deformation of the articulated arm.

Preferably, the point R selected at the articulated arm is the point that is farthest to an equivalent rigid articulated arm formed after the elastic deformation of the articulated arm.

Preferably, using the tilt sensors to detect the angle values of the two different positions of the articulated arm before and after the elastic deformation and obtaining an angle offset $\Delta\theta$ of the articulated arm due to the elastic deformation comprises following steps: setting the angle values detected by the tilt sensors at the head end and the tail end of the articulated arm before the elastic deformation as $\theta_{a0}$ and $\theta_{b0}$, respectively, and setting an angle difference as $\Delta\theta_0$ rendered that the mounting positions of the tilt sensors are not parallel to the axial direction of the articulated arm, then:

$$\Delta\theta_0 = \theta_{b0} - \theta_{a0};$$

It is set that the position of the head end of the articulated arm is point O, the tilt sensors are used to respectively detect the angle values of point O and point P' which are represented by $\theta_{a1}$ and $\theta_{b1}$, respectively, then the angle offset $\Delta\theta$ is calculated to be:

$$\Delta\theta = \theta_{b1} - \theta_{a1} - \Delta\theta_0.$$

Preferably, calculating the length parameter La and the angle parameter $\theta a$ of the articulated arm after the elastic deformation comprises the following steps:

Setting the angle values of $\angle ROP'$ and $\angle RP'O$ as $\angle 1$ and $\angle 2$, respectively, then:

$$\Delta\theta = \angle 1 + \angle 2;$$

According to the triangle theorem, the following is rendered:

$$\frac{\sin\angle 1}{|OR|} = \frac{\sin\angle 2}{|RP'|} = \frac{\sin(\pi - \Delta\theta)}{|OP'|};$$

The formula "$\Delta\theta = \angle 1 + \angle 2$" is substituted to render:

$$\sin(\Delta\theta - \angle 2) = \frac{|OR|}{RP'}\sin\angle 2,$$

Thereby the angle $\theta a$ and the length La of the articulated arm are obtained as:

$$\begin{cases} \theta_a = \theta_{a1} - \angle 1 \\ L_a = |OP'| = \frac{|RP'|\sin\Delta\theta}{\sin\angle 2}. \end{cases}$$

Preferably, according to the length parameter La and the angle parameter $\theta a$, the position parameters $X_p'$ and $Y_p'$ of the point P' can be specifically obtained as follow:

$$\begin{cases} X_p' = L_a\cos\theta_a \\ Y_p' = L_a\sin\theta_a. \end{cases}$$

The present invention also provides a control device of a mechanical articulated arm, which enhances testability and controllability on the state of the articulated arm and then improves control precision.

The control device of a mechanical articulated arm according to the present invention comprises an articulated arm, and also comprises at least two tilt sensors arranged at different positions of the articulated arm, and a controller connected with the tilt sensors; the controller comprises a calculating unit and a driving unit; the calculating unit is used to calibrate the zero positions of the tilt sensors when the articulated arm does not have elastic deformation, the positions of the tail end of the articulated arm before and after the elastic deformation are respectively set as point P and point P', and a point R is selected at the articulated arm; the tilt sensors are used to detect the angle values of the two different positions of the articulated arm before and after the elastic deformation, an angle offset $\Delta\theta$ of the articulated arm due to the elastic deformation is obtained, and a length parameter La and an angle parameter $\theta a$ of the articulated arm after the deformation are calculated based on the angle offset $\Delta\theta$ and the length values of OR and RP'; the position parameters $X_p'$ and $Y_p'$ of the point P' are obtained according to the length parameter La and the angle parameter $\theta a$, and a driving amount is calculated according to the position parameters $X_p'$ and $Y_p'$, and the driving unit is used to control the action of the articulated arm according to the driving amount.

Preferably, at least two tilt sensors are provided at different positions of the articulated arm in the following way: a tilt sensor is provided at the head end and the tail end of each segment of the articulated arm, respectively.

Preferably, the point R selected at the articulated arm is the middle position of the arc formed after the elastic deformation of the articulated arm.

Preferably, the point R selected at the articulated arm is the point that is farthest to an equivalent rigid articulated arm formed after the elastic deformation of the articulated arm.

Compared with the prior art, the present invention has the following advantages:

The present invention fully takes into consideration the elastic deformation of the articulated arm during the movement, and conducts reasoning and operating using the values of the angle changes of the articulated arm before and after the deformation, realizes more accurate and more reliable judgement on the state of the articulated arm, enhances the testability and controllability on the state of the articulated arm and then improves control precision.

DETAILED DESCRIPTION OF THE PRESENT INVENTION

To make the above objects, features and advantages of the present invention clearer and easier to be understood, the present invention will be further detailed hereinafter in conjunction with the accompanying drawings and the embodiments.

The present invention aims to achieve the following object: two or more tilt sensors are provided at different positions (for example, head end and tail end) of a mechanical arm, then the tilt sensors are used to measure an angle value to obtain the state parameters of the mechanical arm after its elastic deformation, the coordinate position parameters of the tail end after the elastic deformation are obtained via mathematic operation, and then mechanical act is controlled according to the position parameters of the tail end.

Figure 1:
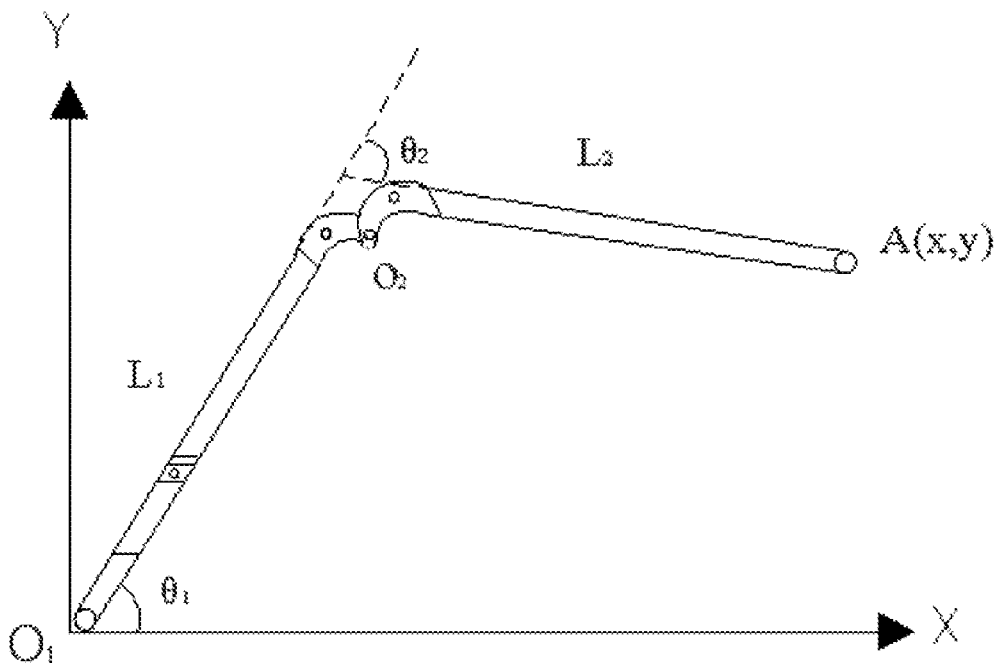
FIG. 1 is a schematic view of an existing two-segment articulated arm.
Figure 2:
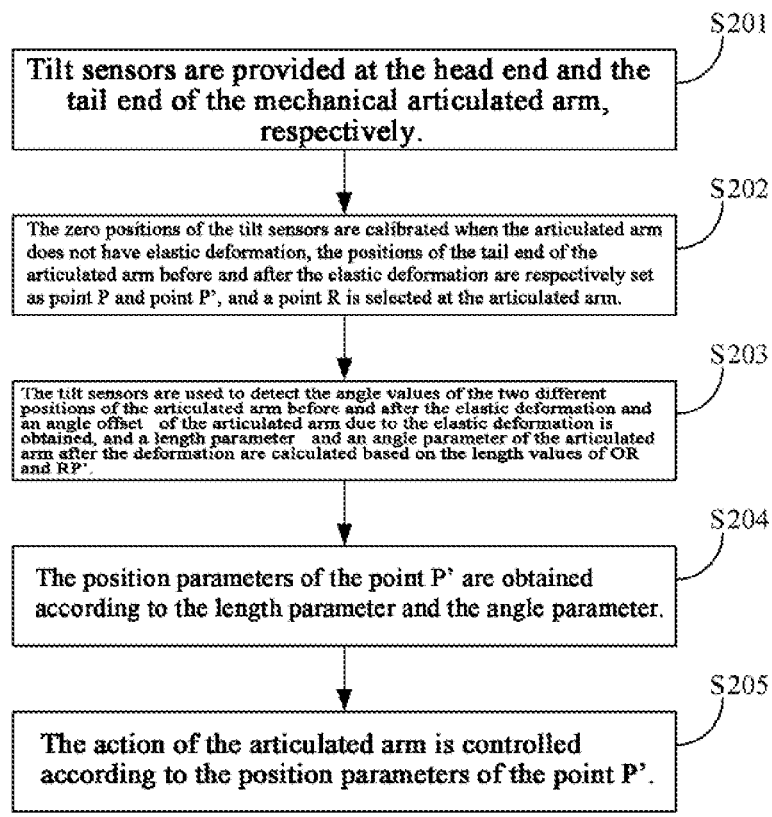
FIG. 2 is a flow chart of the control method of the mechanical articulated arm according to the present invention.

Referring to FIG. 2, it shows the control method of a mechanical articulated arm according to the present invention, comprising following specific steps:

Step S201, a tilt sensor is provided at the head end and the tail end of the mechanical articulated arm, respectively. Of course, the mounting positions of the tilt sensors can be determined according to the length of the mechanical articulated arm and the characteristics of its material, for example, the position can be at L/8, L/4 or L/2 of the articulated arm.

Step S202, the zero positions of the tilt sensors are calibrated when the articulated arm does not have elastic deformation, the positions of the tail end of the articulated arm before and after the elastic deformation are respectively set as point P and point P', and a point R is selected at the articulated arm. The zero positions refer to positions of the articulated arm when the articulated arm is placed at a stand having a complete supporting structure and in a state of having no elastic deformation, and the supporting structure can be horizontal and can also be inclined along the extending direction of the articulated arm, as long as it is ensured that the articulated arm can be completely supported and does not have elastic deformation.

Step S203, the tilt sensors are used to detect the angle values of the two different positions of the articulated arm before and after the elastic deformation and an angle offset $\Delta\theta$ of the articulated arm due to the elastic deformation is obtained, and a length parameter La and an angle parameter $\theta$a of the articulated arm after the deformation are calculated based on the angle offset $\Delta\theta$ and the length values of OR and RP';

Step S204, the position parameters $X_p'$ and $Y_p'$ of the point P' are obtained according to the length parameter La and the angle parameter $\theta$a; and Step S205, the action of the articulated arm is controlled according to the position parameters $X_p'$ and $Y_p'$ of the point P'.

The present invention fully takes into consideration the elastic deformation of the articulated arm during the movement, and conducts reasoning and operating using the values of the angle changes of the articulated arm before and after the deformation, realizes more accurate and more reliable judgement on the state of the articulated arm, enhances the testability and controllability on the state of the articulated arm and then improves control precision.

Figure 3:
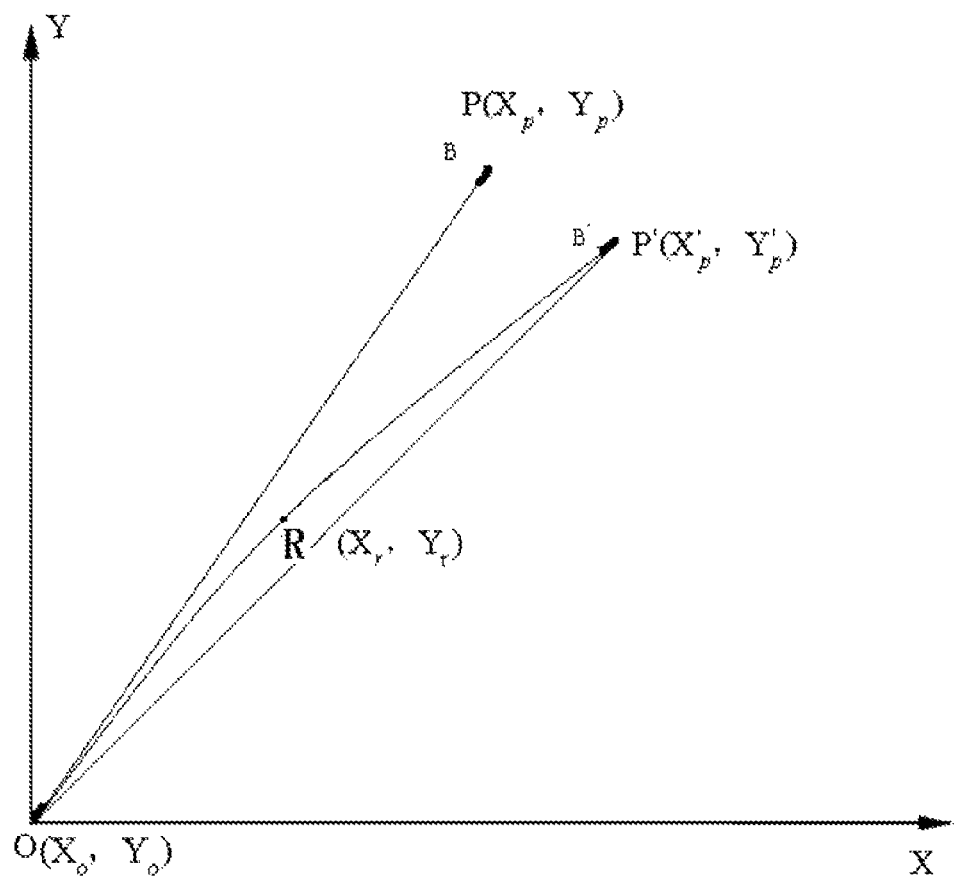
FIG. 3 is the first schematic view of the articulated arm after the elastic deformation according to the present invention.

The following description takes a one-segment articulated arm as an example to detail the computing process of the present invention. As shown in FIG. 3, suppose the direction in which the articulated arm does not have deformation is OP vector direction, and the articulated arm is along the ORP arc direction after the deformation. The point R is set as the midpoint position of the arc formed after the deformation of the articulated arm (the straight-line distance from the midpoint position to point O is equal to that from the midpoint position to the point P). Of course, in the situation that the deformation distribution of the articulated arm is known or can be detected, the point R may be approximately set as the point at the articulated arm that is farthest to an equivalent rigid articulated arm (the OP' segment) after the deformation (as shown in the following FIG. 4). In the situation that the point R is determined artificially, the lengths of OR and RP can also be measured, so that the broken line ORP can more approximately describe the state of the deformed articulated arm extending along the arc ORP'.

Furthermore, to better approximate the deformation of the articulated arm, sampling points M, N and R can be provided at different positions at the articulated arm, for example, at L/8, L/4 and L/2 of the articulated arm, then the broken line OMNRP can more approximately describe the deformation of the articulated arm OP, which substantively is a method of approximating a curve with a broken line, and the more the sampling points are, the higher the precision is. During practical application, the number of the sampling points on the one hand depends on cost of a sampling device and on the other hand depends on the sampling precision of the sampling device, and considering the two factors, a suitable solution can be selected according to the demand on the application precision.

From FIG. 3, the deformed articulated arm ORP can be equivalent to the rigid articulated arm OP', if the length and angle parameters of the OP' can be obtained, the problem of a flexible articulated arm can be transformed into the problem of solving the forward kinematics and the inverse kinematics of the rigid articulated arm. The following will describe how to calculate the precise coordinate parameter of the deformed articulated arm by using an angle difference measured with at least two tilt sensors provided in at least two positions at the mechanical articulated arm.

Figure 5:
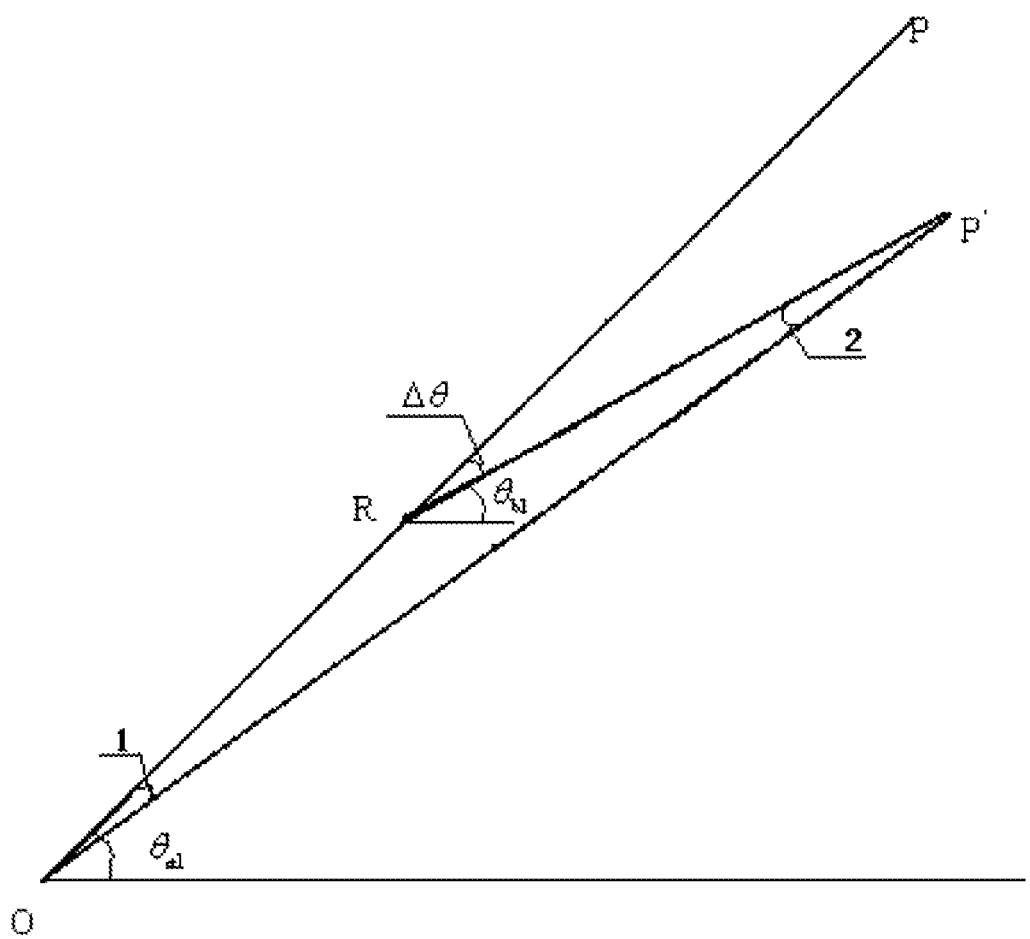
FIG. 5 is the third schematic view of the articulated arm after the elastic deformation according to the present invention.

When the articulated arm only has minute deformation, the tilt sensors are preferably provided at the head end and the tail end of the articulated arm, referring to the position O and the position B (the positions when the articulated arm has not had deformation) or the position B' (the position when the articulated arm has had elastic deformation) in FIG. 3, wherein the coordinate of the position B where the tilt sensor is located is known, the coordinate parameters can be described with the length parameter (i.e., the length parameter of the articulated arm) of OP and the angle parameter of OP, the deformation at the articulated point of the articulated arm is omitted, and the angle parameter of OP is approximately the angle value $\theta_{a0}$ measured by the tilt sensor A at the point A (see FIG. 5).

If the articulated arm OP is placed at a stand having a complete supporting structure so that the articulated arm is in a state of having no elastic deformation, it can be deemed that the angle parameter of OP can also be described with the angle value $\theta_{b0}$ measured by the tilt sensor B at point B, then when the mounting positions of tilt sensors A and B are completely parallel to the axial direction of the articulated arm, there exists the following formula:

$$\theta_{a0} = \theta_{b0} \qquad \text{Formula 6.}$$

During practical application, as the mounting positions of the tilt sensors A and B may not be completely parallel to the axial direction of the articulated arm, this may result in initial deviations of the measurements of the two tilt sensors, that is, $$\theta_{a0} \neq \theta_{b0} \qquad \text{Formula 7.}$$

The measurements of the tilt sensors A and B when the articulated arm has not had elastic deformation are recorded as zero-position values which are respectively represented by $\theta_{a0}$ and $\theta_{b0}$.

It is set that:

$$\Delta\theta_0 = \theta_{b0} - \theta_{a0},$$

That is, $$\theta_{b0} = \theta_{a0} + \Delta\theta_0 \qquad \text{Formula 8.}$$

Figure 4:
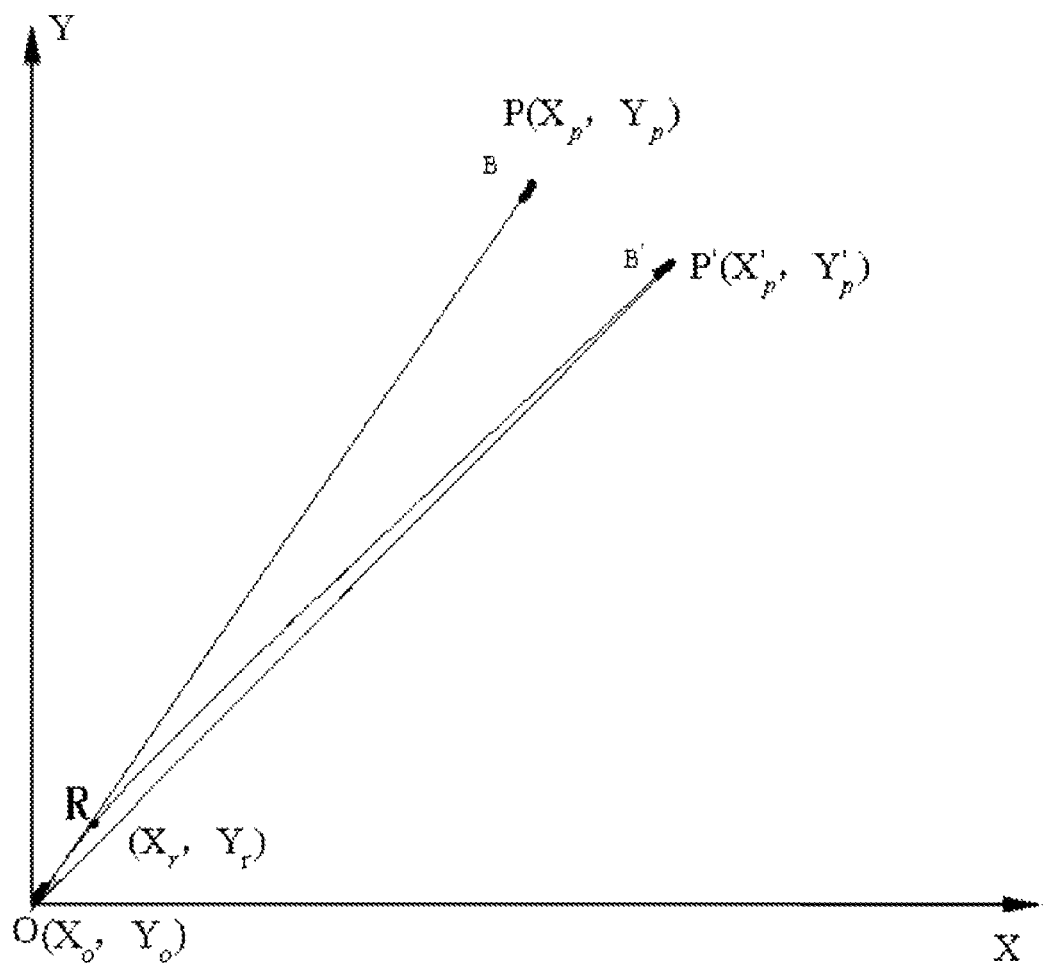
FIG. 4 is the second schematic view of the articulated arm after the elastic deformation according to the present invention.

As shown in FIG. 4, after the deformation of the articulated arm, the angle value of the articulated arm with respect to the zero position measured by the tilt sensor A is $\theta_{a1}$, the angle value of the articulated arm with respect to the zero position measured by the tilt sensor B is $\theta_{b1}$, the offset angle value of the articulated arm after the deformation is, considering the above description, the following formula can be established:

$$\Delta\theta = \theta_{b1} - \theta_{a1} - \Delta\theta_0 \qquad \text{Formula 9.}$$

From FIG. 4, if the selection of the point R meets the condition that OR can be approximately the direction of the articulated arm before the elastic deformation, for $\Delta ORP'$, the following formula can be established:

$$\Delta\theta = \angle 1 + \angle 2 \qquad \text{Formula 10.}$$

The variation of the length parameter of the articulated arm when the articulated arm is deforming is omitted, for the length of the articulated arm, suppose $|OP| = L$ is known, then:

$$|OR| + |RP'| = L \qquad \text{Formula 11.}$$

According to the triangle theorem, the following is rendered:

$$\frac{\sin\angle 1}{|OR|} = \frac{\sin\angle 2}{|RP'|} = \frac{\sin(\pi - \Delta\theta)}{|OP'|}, \qquad \text{Formula 12}$$

that is, $$\begin{cases} \sin\angle 1 = \dfrac{|OR|}{|RP'|}\sin\angle 2 \\ |OP'| = \dfrac{|RP'|\sin\Delta\theta}{\sin\angle 2}. \end{cases} \qquad \text{Formula 13}$$

The formula "$\Delta\theta = \angle 1 + \angle 2$" is substituted into the above formula to render:

$$\sin(\Delta\theta - \angle 2) = \frac{|OR|}{|RP'|}\sin\angle 2, \qquad \text{Formula 14}$$

which is expanded to render:

$$\sin\Delta\theta\cos\angle 2 + \cos\Delta\theta\sin\angle 2 = \frac{|OR|}{|RP'|}\sin\angle 2, \qquad \text{formula 15}$$

that is, $$\cos\angle 2 = \left(\frac{|OR|}{|RP'|} - \cos\Delta\theta\right)\sin\angle 2 / \sin\Delta\theta. \qquad \text{formula 16}$$

It is set that $$k = \left(\frac{|OR|}{|RP'|} - \cos\Delta\theta\right) / \sin\Delta\theta,$$

then $\cos\angle 2 = k \sin\angle 2$ \qquad Formula 17, and also, as $\cos^2 \angle 2 + \sin^2 \angle 2 = 1$,
the following can be rendered from the above:

$$\begin{cases} \angle 2 = \arcsin\left(\sqrt{\dfrac{1}{1+k^2}}\right) \\ \angle 1 = \Delta\theta - \angle 2 \\ OP' = \dfrac{|RP'|\sin\Delta\theta}{\sin\angle 2}. \end{cases} \qquad \text{Formula 18}$$

Thus, the parameters of the angle ($\theta_a$) and the length ($L_a$) of the articulated arm can be obtained as follow:

$$\begin{cases} \theta_a = \theta_{a1} - \angle 1 \\ L_a = |OP'| = \dfrac{|RP'|\sin\Delta\theta}{\sin\angle 2}, \end{cases}$$

and
the position of the tail end of the articulated arm after the deformation is:

$$\begin{cases} X'_p = L_a\cos\theta_a \\ Y'_p = L_a\sin\theta_a. \end{cases}$$

Therefore, the action of the articulated arm can be controlled using the position of the tail end of the articulated arm after the deformation, and this control manner fully takes into consideration the elastic deformation of the articulated arm and improves the precision of the control.

For an articulated arm with two segments or more than two segments, it is only necessary to take the joint of the current segment with the last segment as the point O of the above coordinate, and its solving method can be implemented according to the method shown in the above formulas 7-18.

Figure 6:
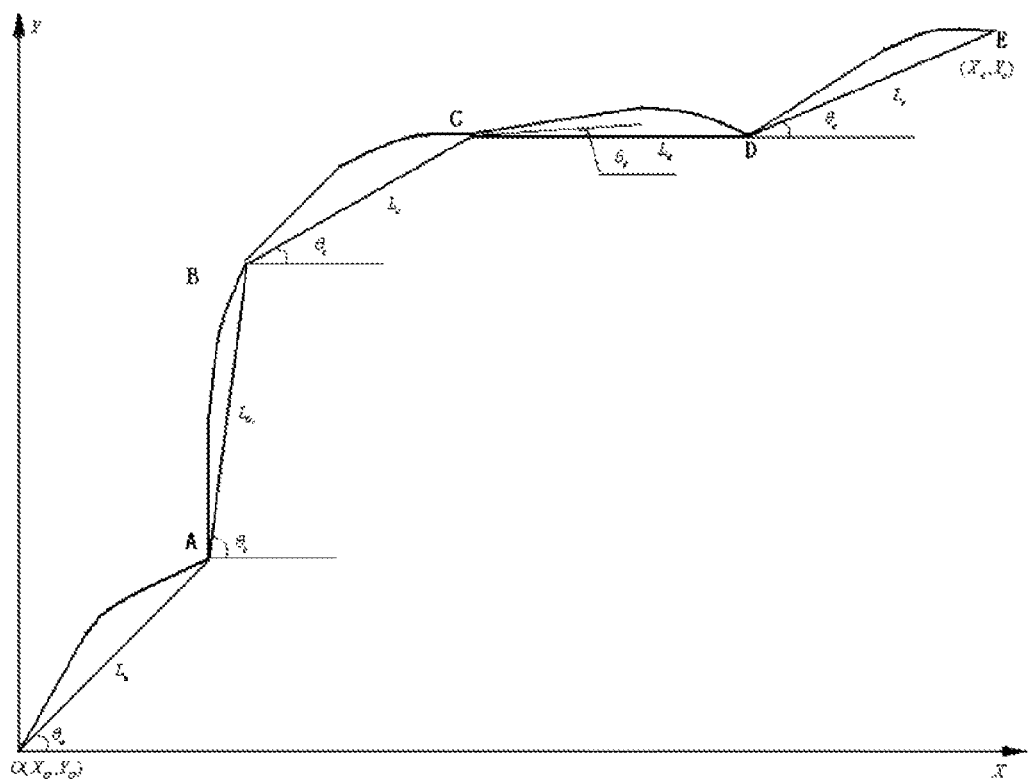
FIG. 6 is a schematic view of a five-segment articulated arm after the elastic deformation according to the present invention.

As shown in FIG. 6, it takes the solution of a five-segment articulated arm as an example, and referring to the above method, the angle parameters $\theta_b$, $\theta_c$, $\theta_d$ and $\theta_e$ and the length parameters $L_b$, $L_c$, $L_d$ and $L_e$ of the second segment 2#, the third segment 3#, the fourth segment 4# and the fifth segment 5# of the articulated arm can be sequentially obtained.

Thus, the coordinate parameters of the tail end of the articulated arm after the deformation are calculated as follow:

$$\begin{cases} X_e = L_a\cos\theta_a + L_b\cos\theta_b + L_c\cos\theta_c + L_d\cos\theta_d + L_e\cos\theta_e \\ Y_e = L_a\sin\theta_a + L_b\sin\theta_b + L_c\sin\theta_c + L_d\sin\theta_d + L_e\sin\theta_e. \end{cases}$$

Figure 7:
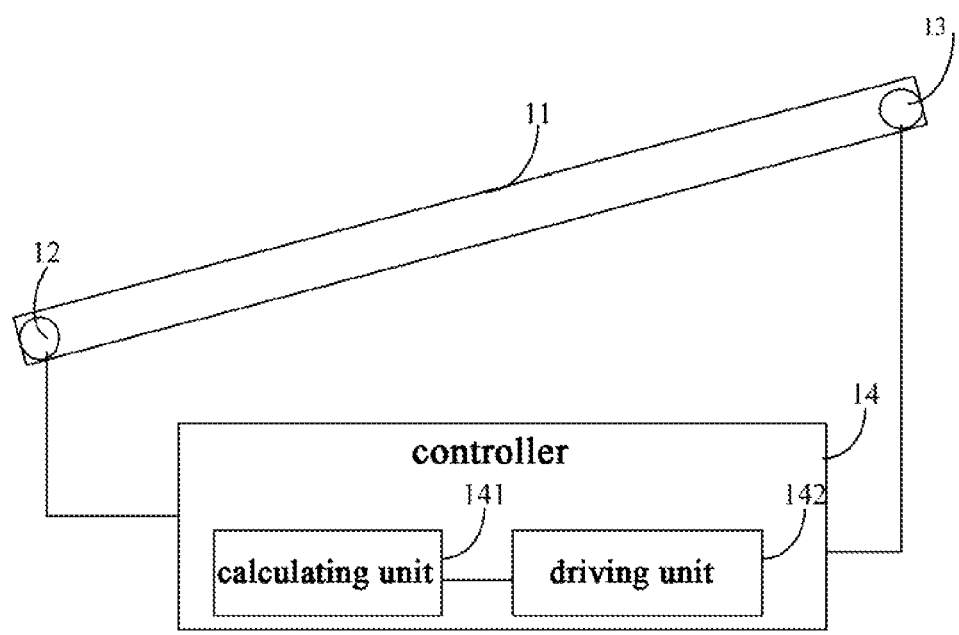
FIG. 7 is a schematic view of the control device of an articulated arm according to the present invention.

Based on the above control method of a mechanical articulated arm, the present invention also provides a control device of a mechanical articulated arm, referring to FIG. 7, it comprises an articulated arm 11, and also comprises a tilt sensor 12 and a tilt sensor 13 provided on the articulated arm 11, and a controller 14 connected with the tilt sensor 12 and the tilt sensor 13, and the controller 14 comprises a calculating unit 141 and a driving unit 142.

The calculating unit 141 is used to calibrate the zero positions of the tilt sensors when the articulated arm does not have elastic deformation, the positions of the tail end of the articulated arm before and after the elastic deformation are respectively set as point P and point P', and a point R is selected at the articulated arm; the tilt sensors are used to detect the angle values of the two different positions of the articulated arm before and after the elastic deformation and an angle offset Δθ of the articulated arm due to the elastic deformation is obtained, and a length parameter La and an angle parameter θa of the articulated arm after the deformation are calculated based on the angle offset Δθ and the length values of OR and RP'; the position parameters $X_p'$ and $Y_p'$ of the point P' are obtained according to the length parameter La and the angle parameter θa, and a driving amount is calculated according to the position parameters $X_p'$ and $Y_p'$;

and the driving unit 142 is used to control the action of the articulated arm according to the driving amount.

The control method and the control device of a mechanical articulated arm provided by the present invention are detailed hereinabove, in which specific examples are used to describe the principles and the embodiments of the present invention, and the above embodiments are just intended to help understand the method and the core thoughts of the present invention; meanwhile, for those skilled in the art, according to the thoughts of the present invention, the specific embodiments and the scope of application may be varied. In conclusion, the content of the description should not be understood as restrictions on the present invention.

The invention claimed is:

1. A method of controlling a mechanical articulated arm, wherein at least two tilt sensors are arranged at different positions of the articulated arm, the method comprising using a controller for:
   calibrating zero positions of the tilt sensors when the articulated arm does not have elastic deformation, setting positions of a tail end of the articulated arm to be a point P and a point P' respectively before and after the elastic deformation, and selecting a point R at the articulated arm;
   using the tilt sensors to detect the angle values of the two different positions of the articulated arm before and after the elastic deformation, obtaining an angle offset Δθ of the articulated arm due to the elastic deformation, and calculating a length parameter La and an angle parameter θa of the articulated arm after the deformation based on the angle offset Δθ and the length values of OR and RP'; and
   obtaining the position parameters $X_p'$ and $Y_p'$ of the point P' according to the length parameter La and the angle parameter θa, and controlling the action of the articulated arm according to the position parameters $X_p'$ and $Y_p'$;
   wherein at least two tilt sensors are provided at different positions of the articulated arm by providing two or more tilt sensors at the head end and the tail end of each segment of the articulated arm, respectively; and
   using the tilt sensors to detect the angle values of the two different positions of the articulated arm before and after the elastic deformation and obtaining an angle offset Δθ of the articulated arm due to the elastic deformation comprises following steps:

setting the angle values detected by the tilt sensors at the head end and the tail end of the articulated arm before the elastic deformation as $θ_{a0}$ and $θ_{b0}$, respectively, and setting an angle difference as $Δθ_0$ rendered that the mounting positions of the tilt sensors are not parallel to the axial direction of the articulated arm, then:

$$Δθ_0 = θ_{b0} - θ_{a0}; \text{ and}$$

setting the position of the head end of the articulated arm as point O, using the tilt sensors to respectively detect the angle values of point O and point P' which are represented by $θ_{a1}$ and $θ_{b1}$, respectively, then calculating the angle offset Δθ as follow:

$$Δθ = θ_{b1} - θ_{a1} - Δθ_0.$$

2. The method according to claim 1, wherein the point R selected at the articulated arm is the middle position of the arc formed after the elastic deformation of the articulated arm.

3. The method according to claim 2, wherein calculating the length parameter La and the angle parameter θa of the articulated arm after the elastic deformation comprises the following steps:
   Setting the angle values of ∠ROP' and ∠RP'O as ∠1 and ∠2, respectively, then:

$$Δθ = ∠1 + ∠2;$$

according to the triangle theorem, the following is rendered:

$$\frac{\sin∠1}{|OR|} = \frac{\sin∠2}{|RP'|} = \frac{\sin(π - Δθ)}{|OP'|};$$

substituting the formula "Δθ=∠1+∠2" to render:

$$\sin(Δθ - ∠2) = \frac{|OR|}{RP'} \sin∠2,$$

thereby obtaining the angle θa and the length La of the articulated arm:

$$\begin{cases} θ_a = θ_{a1} - ∠1 \\ L_a = |OP'| = \frac{|RP'| \sin Δθ}{\sin ∠2} \end{cases}.$$

4. The method according to claim 3, wherein according to the length parameter La and the angle parameter θa, the position parameters $X_p'$ and $Y_p'$ of the point P' can be specifically obtained as follow:

$$\begin{cases} X_p' = L_a \cos θ_a \\ Y_p' = L_a \sin θ_a \end{cases}.$$

5. The method according to claim 1, wherein the point R selected at the articulated arm is the point that is farthest to an equivalent rigid articulated arm formed after the elastic deformation of the articulated arm.

6. The method according to claim 5, wherein calculating the length parameter La and the angle parameter θa of the articulated arm after the elastic deformation comprises the following steps:

Setting the angle values of ∠ROP' and ∠RP'O as ∠1 and ∠2, respectively, then:

$$\Delta\theta = \angle 1 + \angle 2;$$

according to the triangle theorem, the following is rendered:

$$\frac{\sin\angle 1}{|OR|} = \frac{\sin\angle 2}{|RP'|} = \frac{\sin(\pi - \Delta\theta)}{|OP'|};$$

substituting the formula "$\Delta\theta = \angle 1 + \angle 2$" to render:

$$\sin(\Delta\theta - \angle 2) = \frac{|OR|}{RP'}\sin\angle 2,$$

thereby obtaining the angle θa and the length La of the articulated arm:

$$\begin{cases} \theta_a = \theta_{a1} - \angle 1 \\ L_a = |OP'| = \frac{|RP'|\sin\Delta\theta}{\sin\angle 2}. \end{cases}$$

7. The method according to claim 6, wherein according to the length parameter La and the angle parameter θa, the position parameters $X_p'$ and $Y_p'$ of the point P' can be specifically obtained as follow:

$$\begin{cases} X_p' = L_a\cos\theta_a \\ Y_p' = L_a\sin\theta_a. \end{cases}$$

8. The method according to claim 1, wherein calculating the length parameter La and the angle parameter θa of the articulated arm after the elastic deformation comprises the following steps:

setting the angle values of ∠ROP' and ∠RP'O as ∠1 and ∠2, respectively, then:

$$\angle\theta = \angle 1 + \angle 2;$$

according to the triangle theorem, the following is rendered:

$$\frac{\sin\angle 1}{|OR|} = \frac{\sin\angle 2}{|RP'|} = \frac{\sin(\pi - \Delta\theta)}{|OP'|};$$

substituting the formula "$\Delta\theta = \angle 1 + \angle 2$" to render:

$$\sin(\Delta\theta - \angle 2) = \frac{|OR|}{RP'}\sin\angle 2,$$

thereby obtaining the angle θa and the length La of the articulated arm:

$$\begin{cases} \theta_a = \theta_{a1} - \angle 1 \\ L_a = |OP'| = \frac{|RP'|\sin\Delta\theta}{\sin\angle 2}. \end{cases}$$

9. The method according to claim 8, wherein according to the length parameter La and the angle parameter θa, the position parameters $X_p'$ and $Y_p'$ of the point P' can be specifically obtained as follow:

$$\begin{cases} X_p' = L_a\cos\theta_a \\ Y_p' = L_a\sin\theta_a. \end{cases}$$

10. A control device of a mechanical articulated arm comprising an articulated arm, wherein, further comprising at least two tilt sensors arranged at different positions of the articulated arm, and a controller connected with the tilt sensors; the controller comprising a calculating unit and a driving unit:

the calculating unit being used to calibrate the zero positions of the tilt sensors when the articulated arm does not have elastic deformation, the positions of the tail end of the articulated arm before and after the elastic deformation being respectively set as point P and point P', a point R being selected at the articulated arm; the tilt sensors being used to detect the angle values of the two different positions of the articulated arm before and after the elastic deformation, an angle offset Δθ of the articulated arm due to the elastic deformation being obtained, and a length parameter La and an angle parameter θa of the articulated arm after the deformation being calculated based on the angle offset Δθ and the length values of OR and RP'; the position parameters $X_p'$ and $Y_p'$ of the point P' being obtained according to the length parameter La and the angle parameter θa, and a driving amount being calculated according to the position parameters $X_p'$ and $Y_p'$; and the driving unit being used to control the action of the articulated arm according to the driving amount;

wherein at least two tilt sensors are provided at different positions of the articulated arm by providing two or more tilt sensors at the head end and the tail end of each segment of the articulated arm, respectively; and using the tilt sensors to detect the angle values of the two different positions of the articulated arm before and after the elastic deformation and obtaining an angle offset Δθ of the articulated arm due to the elastic deformation comprises following steps:

setting the angle values detected by the tilt sensors at the head end and the tail end of the articulated arm before the elastic deformation as $0_{a0}$ and $0_{b0}$, respectively, and setting an angle difference as $\Delta 0_0$ rendered that the mounting positions of the tilt sensors are not parallel to the axial direction of the articulated arm, then:

$$\Delta 0_0 = 0_{b0} - 0_{a0}; \text{ and}$$

setting the position of the head end of the articulated arm as point O, using the tilt sensors to respectively detect the angle values of point O and point P' which are represented by $0_{a1}$ and $0_{b1}$, respectively, then calculating the angle offset Δ0 as follow:

$$\Delta 0 = 0_{b1} - 0_{a1} - \Delta 0_0.$$

11. The device according to claim 10, wherein the point R selected at the articulated arm is the middle position of the arc formed after the elastic deformation of the articulated arm.

12. The device according to claim 10, wherein the point R selected at the articulated arm is the point that is farthest to an equivalent rigid articulated arm formed after the elastic deformation of the articulated arm.

* * * * *